United States Patent [19]
Bonnaud

[11] 3,813,894
[45] June 4, 1974

[54] COOLING APPARATUS FOR AN AUTOMOBILE VEHICLE

[75] Inventor: Michel Bonnaud, Montbeliard, France

[73] Assignees: Automobiles Peugeot, Paris; Regie Nationale des Usines Renault, Billancourt, France

[22] Filed: Mar. 6, 1973

[21] Appl. No.: 338,513

[30] Foreign Application Priority Data
Mar. 17, 1972 France.......................... 72.09474

[52] U.S. Cl........................ 62/181, 62/243, 62/323
[51] Int. Cl............................................. F25b 27/00
[58] Field of Search ............ 62/181, 323, 243, 244, 62/226

[56] References Cited
UNITED STATES PATENTS
2,746,261   5/1956   Gibson................................. 62/243
3,186,184   6/1965   Pruitt................................... 62/323

Primary Examiner—Meyer Perlin
Attorney, Agent, or Firm—Burns, Doane, Swecker & Mathis

[57] ABSTRACT

Cooling apparatus for an automobile vehicle comprising a compressor, an evaporator, a condenser and a fan associated with the condenser. The compressor and the fan are adapted to be driven by the vehicle engine through respective electromagnetic clutches controlled through electric control circuits. This apparatus is improved in that cut out means are inserted in the electric control circuit of the compressor and/or fan. The cut out means are controlled by a control member controlling the acceleration of the vehicle so as to release automatically the clutch of the compressor and/or fan when the control member reaches a given position.

1 Claim, 1 Drawing Figure

PATENTED JUN 4 1974  3,813,894
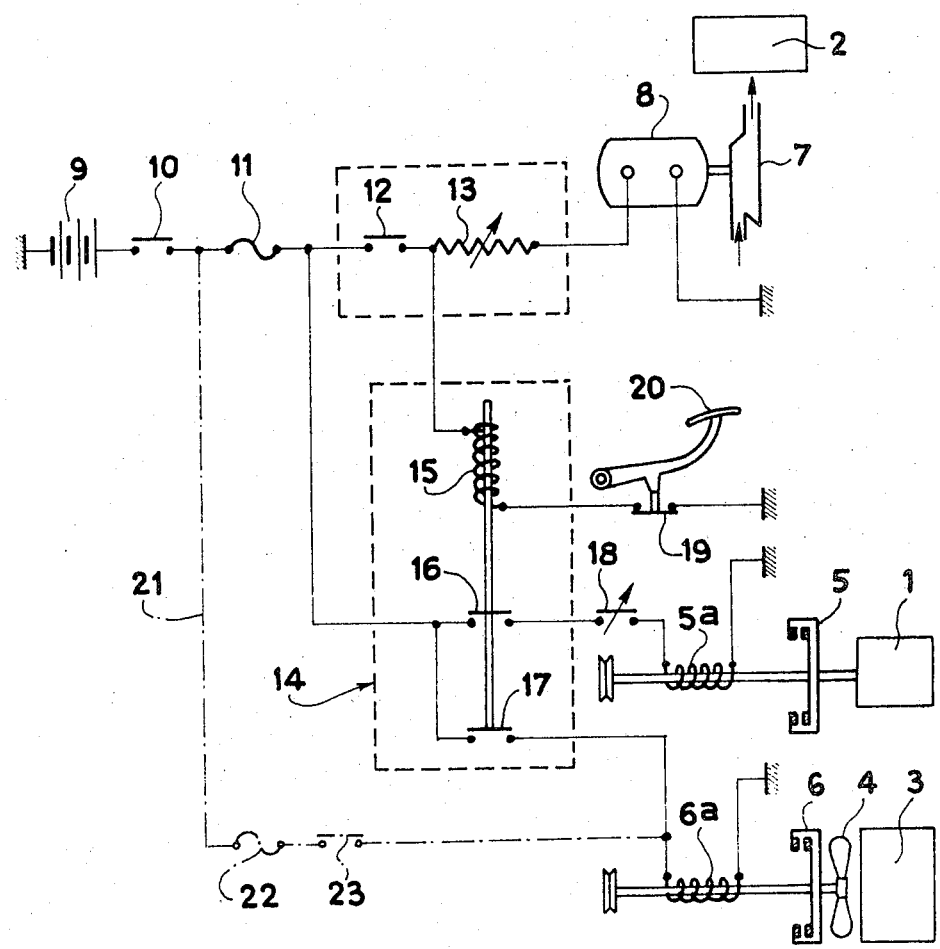

COOLING APPARATUS FOR AN AUTOMOBILE VEHICLE

The present invention relates to a cooling apparatus installed in an automobile vehicle and more precisely to the control of this apparatus.

It is known that cooling apparatuses installed on automobile vehicles for cooling the passenger compartment comprise a coolant fluid compressor, an evaporator and a condenser, the latter being equipped with a fan. Now, the compressor and the fan are driven by the engine of the vehicle and absorb around 10 horsepower which decreases to this extent the available effective power for propelling the vehicle and affects the acceleration and top speed of the vehicle. This has a particularly noticeable and adverse effect in certain conditions in vehicles of small or medium capacity.

An object of the invention is to modify the usual control devices for these cooling apparatuses so as to remedy the aforementioned drawback in certain conditions where all the power furnished by the engine must be employed for propelling the vehicle.

This result is obtained by providing in the electric control circuit of the compressor and/or fan of the condenser, driven by the engine, means which are actuated in accordance with the position of an element controlling the acceleration so as to cut off automatically the drive connection between the engine and one and/or the other of said devices when said control element reaches a given position.

One embodiment of the invention will be described with reference to the accompanying drawing in which the single FIGURE represents diagrammatically the various components of the cooling apparatus and its control device.

There is seen in this FIGURE a cooling apparatus for achieving the air conditioning inside the passenger compartment of an automobile vehicle, this apparatus comprising mainly a compressor 1, an evaporator 2 and a condenser 3 with which a fan 4 is associated.

The compressor and the fan are driven by the engine (not shown) through two clutches 5, 6 controlled electromagnetically. The evaporator comprises a fan 7 driven by an electric motor 8. The control circuit, and if desired the power supply to these various elements, comprises mainly the battery 9 of the vehicle or some other source of dc current, a main switch 10 which may be incorporated in an antitheft device, a protecting fuse 11 and a switch 12 controlling the cooling assembly. A rheostat 13 is disposed between the switch 12 and the motor 8. The electromagnetic clutches 5, 6 are controlled by a relay 14 including a coil or solenoid 15 and two contacts 16, 17 connected in series respectively with the coils 5a, 6a of the clutches 5, 6. A thermostat 18 is disposed between the contact 16 and the coil 5a.

Provided between the solenoid 15 and ground is an additional switch 19 which is normally in the closed position and actuated by an element controlling the acceleration, for example the accelerator pedal 20 of the vehicle.

This apparatus operates in the following manner:

With the two switches 10 and 12 and the switch 19 closed, the solenoid 15 of the relay 14 is energized and the contacts 16, 17 are closed. The compressor 1 and the fan 4 can then be driven by the engine of the vehicle, the operation of the compressor being however sometimes interrupted by the opening of the thermostat switch 18. The fan 7 of the evaporator is also driven by its electric motor 8.

If the accelerator pedal is depressed beyond a predetermined position corresponding, for example, to overtaking or a spurt of speed, the switch 19 opens and this cuts off the supply to the relay 14 and causes the two contacts 16, 17 to open. The clutches 5, 6 are then brought to the declutched position. The compressor and the fan are no longer driven and all the power developed by the engine is employed in propelling the vehicle. The gain in power may be around 10 horsepower, which is considerable, especially in the case of an engine of small or medium capacity.

It will be understood that as soon as the accelerator pedal is released, the compressor and the fan are once again driven by the engine.

There has been shown in dot-dash line in the FIGURE an additional junction 21 between the battery 9 and the fan 4 corresponding to the case where this fan also cools the engine. This junction includes a fuse 22 and a thermocontact 23 and ensures that the supply of power to the clutch 6 is maintained when the temperature of the engine requires operation of the fan. In this case solely the drive connection between the engine and the compressor is interrupted, but the gain in power is far from being negligible.

It will be observed that in both cases the fan of the evaporator operates in a continuous manner so that as the action on the switch 19 is usually of short duration, the temperature of the air distributed in the passenger compartment is hardly modified owing to the thermal inertia of the fluid circuit.

Having now described my invention, what I claim as new and desire to secure by Letters Patent is:

1. In a cooling apparatus for equipping an automobile vehicle comprising a compressor, an evaporator, a condenser and a fan associated with the condenser, the compressor and the fan being adapted to be driven by an engine of the vehicle through respective electromagnetic clutches controlled through electric control circuits; the improvement comprising in the electric control circuit of at least one of two elements consisting of the compressor and the fan, cut out means, a control member for controlling the acceleration of the vehicle and means operatively connecting the control member to the cut out means so as to release automatically the clutch of said one of said elements when said control member reaches a given position, said fan being provided for cooling both the condenser and the engine of the vehicle, two electric control circuits in parallel being provided for the electromagnetic clutch for said fan, one of said two control circuits being connected to be controlled by said cut out means and the other of said two control circuits being connected to be controlled by a thermocontact responsive to the temperature of the engine.

* * * * *